UNITED STATES PATENT OFFICE.

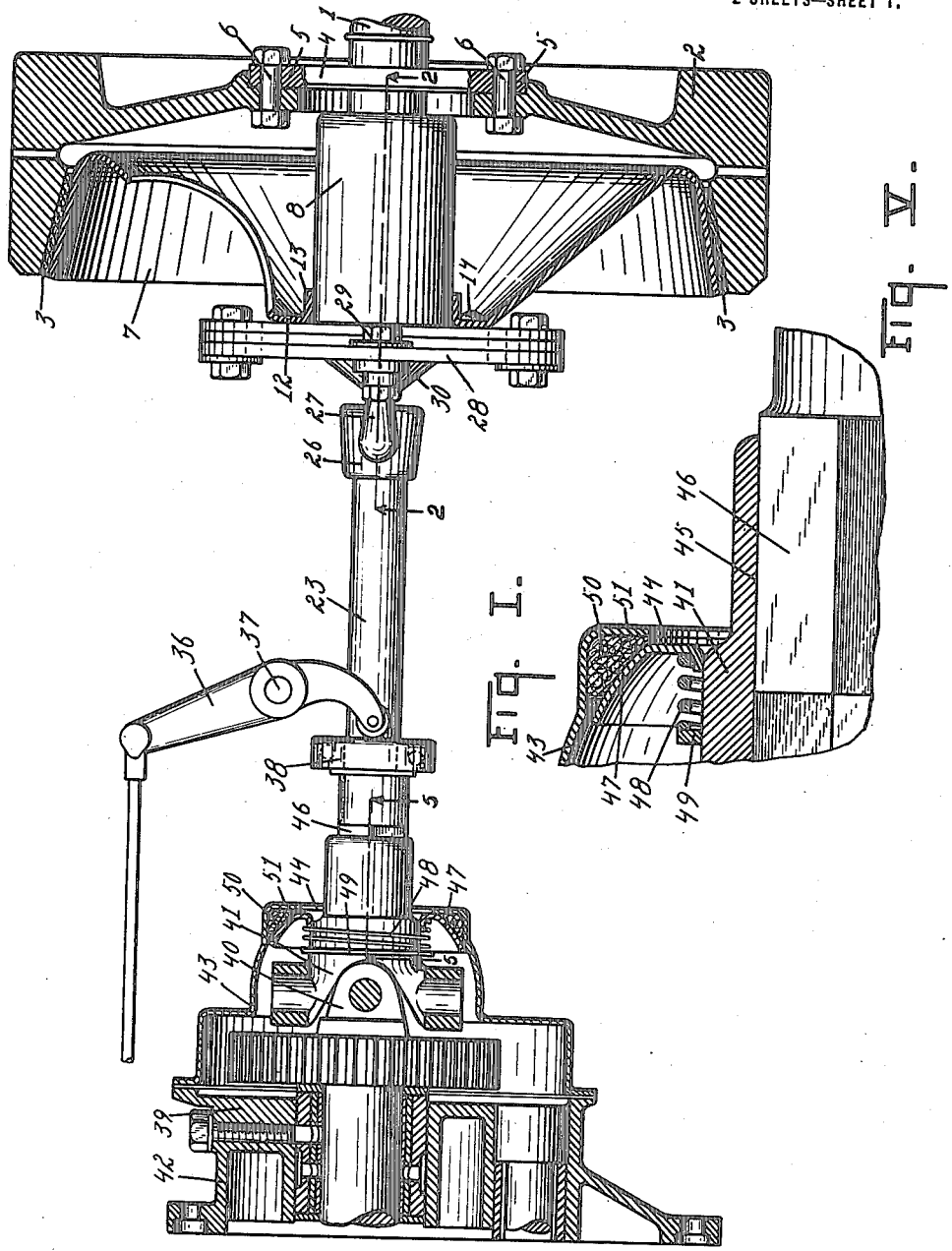

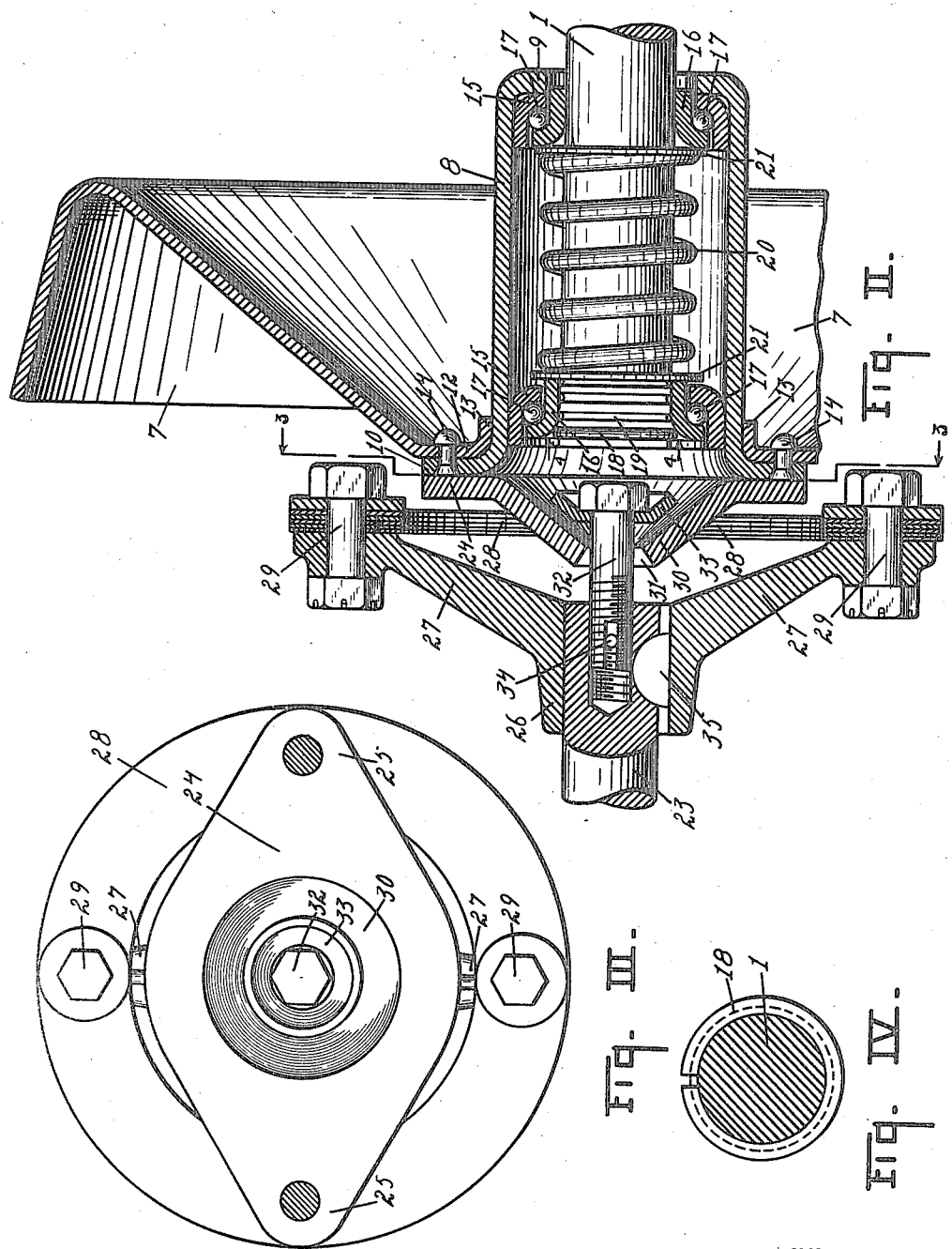

JAMES GUTHRIE, OF JACKSON, MICHIGAN, ASSIGNOR TO BRISCOE MOTOR CO., INC., OF JACKSON, MICHIGAN.

TRANSMISSION MECHANISM.

1,216,307. Specification of Letters Patent. Patented Feb. 20, 1917.

Original application filed July 17, 1915, Serial No. 40,403. Divided and this application filed March 1, 1916. Serial No. 81,495.

*To all whom it may concern:*

Be it known that I, JAMES GUTHRIE, a citizen of the United States, residing at the city and county of Jackson and State of Michigan, have invented certain new and useful Improvements in Transmission Mechanisms, of which the following is a specification.

This invention relates to improvements in transmission mechanisms. My improved transmission mechanism is especially designed by me and I have shown the same embodied in a structure adapted for use as a transmission for motor vehicles.
The main object of this invention is to provide an improved transmission mechanism which is efficient and durable in use and one which is at the same time simple and compact in structure.
Further objects, and objects relating to details and economies of construction and operation will definitely appear from the detailed description to follow.

I accomplish the objects of my invention by the devices and means described in the following specification. The invention is clearly defined and pointed out in the claims.

A structure constituting a preferred embodiment of my invention is illustrated in the accompanying drawing forming a part of this specification, in which:

Figure I is a detail side view partially in longitudinal section of a structure embodying my improvements.
Fig. II is an enlarged detail section on a line corresponding to line 2—2 of Fig. I.

Fig. III is a transverse section on a line corresponding to the broken line 3—3 of Fig. II.
Fig. IV is a detail transverse section on a line corresponding to the line 4—4 of Fig. II, showing means for adjustably supporting the outer driven clutch member bearing on the driving shaft.
Fig. V is an enlarged detail longitudinal section on a line corresponding to line 5—5 of Fig. I.

In the drawing similar reference characters refer to similar parts throughout the several views and the sectional views are taken looking in the direction of the little arrows at the ends of the section lines.

Referring to the drawing 1 represents the driving shaft such as the crank shaft of an engine. In the embodiment illustrated, the driving shaft is provided with a fly wheel 2 provided with a conical clutch member 3. The fly wheel is carried by a spider 4, being secured to the ring 5 of the spider by means of the bolts 6.

The driven clutch member 7 is preferably a stamping and is provided with a barrel-like hub 8 having an inturned flange 9 at its inner end and an out-turned flange 10 at its outer end. See Fig. II.

The web 12 of the driven clutch member 7 is provided with an inturned portion 13 sleeved upon the hub 8 and secured to the flange 10 thereof by the rivets 14. A pair of ball bearings are provided for the driven clutch member, the bearings being adapted to receive the thrust on the clutch. These bearings consist of the outer bearing cones 15 fitting within the hub 8 and the inner bearing cones 16 on the driving shaft 1. Balls 17 are interposed between the cones. The inner bearing is supported axially by the inturned flange 9 of the hub 8. The outer bearing is adjustably supported axially by the retaining ring 18 which is engaged with one or another of the peripheral grooves 19 on the shaft 1. Between these bearings is a coiled spring 20. Thrust washers or collars 21 are interposed between the ends of the spring and the bearings, as clearly shown in Fig. II. With the parts thus arranged, the outer bearing being fixed to the shaft, the spring tends to hold the driven clutch member in engagement with the driving clutch.

The driven clutch member is connected to the driven shaft 23 by a universal joint, which, in the structure illustrated, consists of the joint member 24 having cross arms 25 and joint member 26 having cross arms 27. The arms of these joint members are disposed at right angles to each other. They are connected by an intermediate member 28 made up of a plurality of resilient annular pieces and secured to the arms of the joint members by bolts 29. The joint member 24 is provided with a conical portion 30 having a central hole 31.

A bolt 32 is threaded into the end of the driven shaft 23, the head of the bolt being engaged within the conical part 30 of the joint member 24 to provide a lost motion connection for the driven shaft to the driven clutch member. A cupped washer 33 is provided for the head of the bolt. A pin 34 prevents the turning of the bolt in the shaft member 23. The shaft member 23 is secured to the joint member 26 by the feather 35.

I have described and claimed this clutch mechanism in my application for Letters Patent, filed July 17, 1915, Serial No. 40,403, my present application being a division of that application.

The driven shaft 23 is shifted by means of the lever 36 pivoted at 37 to engage the thrust collar 38 on the shaft 23. The shaft is connected to a transmission designated generally by the numeral 39 through a universal joint comprising a joint member 40 and a member 41. A transmission housing or gear case 42 is provided with a housing part 43 embracing this joint. This housing has an opening 44 at its outer end through which the joint member 41 projects. The joint member 41 has a socket 45 adapted to receive the squared end 46 of the driven shaft providing a slip connection between said driven shaft and the joint.

On the joint member 41 is a spherically curved closure member 47 yieldingly supported by the spring 48, the inner end of which engages the thrust collar or rest 49 on the joint member. A packing 50 is arranged between the closure member and the flange 51 of the housing forming an effective closure for the opening about the shaft and one permitting the necessary movement between the parts.

My improved transmission mechanism is simple and compact and at the same time is efficient and durable and easy to operate. I have illustrated and described my improvements in a simple and practical embodiment. I have not attempted to illustrate or describe various modifications and structural details which I contemplate as I believe the disclosure made will enable those skilled in the art to which my invention relates to embody or adapt the same as may be desired.

Having thus described my invention, what I claim as new and desire to secure by Letters Patent is:

1. The combination of a driving shaft, a driven shaft, a driving clutch member on said driving shaft, a coacting driven clutch member provided with a hub, a pair of ball bearings disposed within said hub, the outer ball bearing being supported axially by said shaft and the inner by said hub, a coiled spring arranged on said driving shaft between said bearings and acting to engage the clutch, a universal joint comprising a pair of cross members secured to said driven shaft and driven clutch member and an annular resilient intermediate member secured to the arms of said cross members, a lost motion clutch shifting connection from said driven shaft to said driven clutch member, a transmission shaft, a universal joint connection from said driven shaft to said transmission shaft comprising a joint member having a socket in which said driven shaft is disposed for longitudinal movement, and means for shifting said driven shaft.

2. The combination of a driving shaft, a driven shaft, a driving clutch member on said driving shaft, a coacting driven clutch member provided with a hub, a pair of ball bearings disposed within said hub, the outer ball bearing being supported axially by said shaft and the inner by said hub, a coiled spring arranged on said driving shaft between said bearings and acting to engage the clutch, a universal joint connection for said driven shaft to said driven clutch member, a lost motion clutch shifting connection from said driven shaft to said driven clutch member, a transmission shaft, a universal joint connection from said driven shaft to said transmission shaft comprising a joint member having a socket in which said driven shaft is disposed for longitudinal movement, and means for shifting said driven shaft.

3. The combination of a driven shaft, a driving clutch member, a coacting driven clutch member, a universal joint connection for said driven clutch member and driven shaft, a lost motion clutch shifting connection from said driven shaft to said driven clutch member, a transmission shaft, a universal joint connection from said driven shaft to said transmission shaft comprising a joint member having a socket in which said driven shaft is disposed for longitudinal movement, and means for shifting said driven shaft.

4. The combination of a driven shaft, a driving clutch member, a coacting driven clutch member, a universal joint connection for said driven clutch member and driven shaft, a lost motion clutch shifting connection from said driven shaft to said driven clutch member, a transmission shaft, and a universal joint connection from said driven shaft to said transmission shaft, there being a slip connection between the said driven shaft and joint permitting the longitudinal movement of said driven shaft for disengaging and engaging said clutch.

5. The combination of a driven shaft, a driving clutch member, a coacting driven clutch member, a universal joint connection from said driven clutch member and driven shaft. said driven shaft having a lost motion clutch shifting connection to said driven clutch member, a transmission shaft, and a driving connection from said driven shaft to said transmission shaft including a universal joint and means permitting longitudinal movement of said driven shaft for engaging and disengaging said clutch.

In witness whereof I have hereunto set my hand and seal in the presence of two witnesses.

JAMES GUTHRIE. [L. S.]

Witnesses:
L. E. LATTA,
Miss H. PICKETT.